Patented Nov. 5, 1929

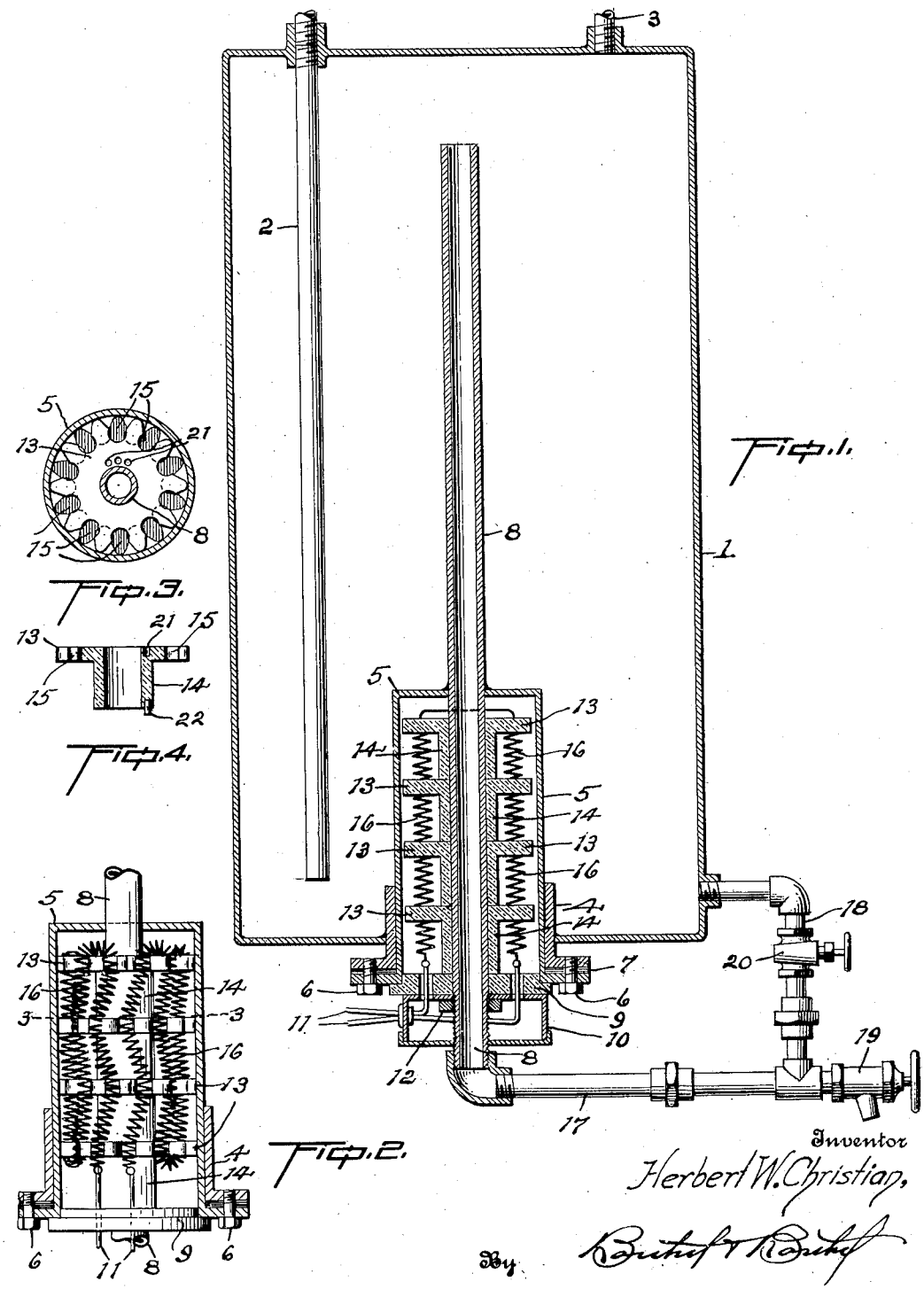

1,734,075

UNITED STATES PATENT OFFICE

HERBERT W. CHRISTIAN, OF WINDSOR, ONTARIO, CANADA

WATER HEATER

Application filed September 14, 1928,.Serial No. 305,892, and in Canada September 16, 1927.

This invention relates to a water heater of the class in which an electrically heated element is employed, and the object of the present invention is to provide an arrangement whereby an axial flow of water is provided through the heating element and said element is arranged to be mounted within a heating tank or other receptacle in such a manner that the electrically heated element itself may be quickly and easily detached and removed for the purpose of replacement or repair. A further object is to provide an electric heating element in which the heating coil is carried by an insulating support in such a manner as to firmly hold the coil at all times and prevent the runs of the coil from sagging or becoming displaced in use.

With the above and other ends in view the invention consists in the matters hereinafter set forth and more particularly pointed out in the appended claims, reference being had to the accompanying drawing, in which—

Figure 1 is a longitudinal vertical section through a water tank and heating element therein and illustrative of an embodiment of the invention;

Fig. 2 is a longitudinal vertical section through the chamber in which the heating element is disposed, and showing the element in side elevation therein;

Fig. 3 is a transverse section substantially upon the line 3—3 of Figure 2; and

Fig. 4 is a sectional detail of an insulating coil supporting disk.

As shown in the drawing, 1 indicates a water tank or other receptacle of any desired shape and construction, and leading into this tank through the upper end thereof is a water feed pipe 2 which extends to a point adjacent the lower end of the tank. The usual water outlet 3 is provided in the upper end of the tank.

Secured centrally within the bottom wall of the tank and extending therethrough is a bushing 4 to receive a tubular casing 5, the lower end of said casing being flanged and the outer end of the bushing being also flanged for the purpose of securing the casing within the bushing by means of bolts 6 passing through the flanges. A suitable packing 7 is provided between the flanges to make a water tight joint, and extending axially through the casing 5 is a water circulation pipe 8 which is permanently welded or otherwise secured within an opening in the upper end of the casing 5 through which the pipe extends.

An electric heating element is sleeved upon the pipe 8 within the casing 5 and is removable endwise through the open lower end of the casing. This heating element comprises an insulating disk 9 which is secured in any suitable manner in the open lower end of the casing 5 and forms a closure therefor, and mounted upon the outer surface of this disk 9 is an outlet box 10 of the usual form and construction to enclose the lead-in wires 11. The entire heating element and the disk 9 together with the outlet box are firmly secured in place within the casing 5 by means of a nut 12 screwed upon the lower projecting screw-threaded end of the pipe 8, the nut serving to clamp the disk 9 firmly against the lower end of the casing 4 and thus support the heating element within said casing.

The heating element comprises a series of separate disk like members 13 which are formed of insulating material with a hub or sleeve portion 14 projecting laterally from each disk with an axial hole through each disk and hub to receive the pipe 8. The periphery of each disk is formed with a series of notches or recesses 15 as clearly shown in Figure 3, these notches or peripheral recesses being provided to receive the heating coil 16 which is the usual form of continuous resistance wire coil, each run of which is threaded longitudinally of the heating element through the notches or recesses in the peripheral portions of the several disks.

In order that each run of the coil may be firmly held by the disks and prevented from sagging one run into contact with the other and thus making a short circuit, each disk 13 has its recesses 15 arranged in staggered relation circumferentially of the disks, with relation to the adjacent disk or disks, that is, each disk is turned slightly relative to adjacent disks so that the notches or recesses in the peripheries of the several disks will not be in alignment, and therefore when the coil is threaded through these notches it will extend, as shown in Figure 2, in a wavy or zigzag direction throughout the length of the heating element. This bending or lateral deflection of each run of the coil between the several disks, prevents the disengagement of the coil from the notches or recesses in the disks and also puts a tension on the coil which will firmly hold the several runs of the coil against sagging, should any one of the runs become extended in use and lose its tension. If a run of the coil should sag or bend laterally it might come into contact with an adjacent run and cause a short circuit. This is prevented by the relative arrangement of the peripheral recesses in the several disks and the zigzag direction of each run of the coil.

The several disks 13 are sleeved upon the pipe 8 and held in spaced relation by their hub portions 14, and to hold the several disks in their relative positions with the recesses in each disk in staggered relation to the recesses of adjacent disks, each disk is formed with a plurality of small holes or recesses 21, and the opposite end or hub of the disk is provided with a longitudinally extending pin 22 so that when the several insulators or disks are placed together upon the pipe 8, the pin 22 on one disk will be engaged within an opening 21 in an adjacent disk, and thus hold the disks in the relative position to which they are adjusted, there being a plurality of the openings 21 to provide for such adjustment.

The lead-in wires 11 are connected in any suitable manner to the ends of the continuous resistance coil and these wires enter the lower end of the casing 5 through suitable openings in the disk 9.

When the heater is in operation, a flow of water is maintained through the pipe 8 by connecting the lower end of this pipe to a laterally extending pipe 17 and a branch connection 18 is tapped into the side of the tank 1 adjacent its lower end and connected with the pipe 17 so that as the water in the tank becomes heated by the operation of the heating unit, the water in the pipe 8 will become rapidly heated because it is entirely surrounded by the heating element and will rise in the pipe 8 to the top of the tank 1. The water from the bottom or cool end of the tank will flow through the connections 18 and 17 into the lower end of the pipe 8 to replace the hot water which has escaped through the open upper end of the pipe 8 into the upper end of the tank. A continuous circulation of water is thus maintained in the tank and a much more rapid heating of the water is secured.

When it is desired to draw off the water from the tank for the purpose of cleaning, etc., a discharge cock 19 provided on the outer end of the pipe 17 is opened, and when it is desired to draw hot water from the tank through this cock, a valve 20 in the connection 18 is closed, thus drawing hot water directly from the top of the tank through the pipe 8. Ordinarily the valve 20 is open and the valve 19 is closed, thus providing for a free flow of water from the bottom of the tank through the central circulating pipe 8 into the top of the tank. Cold water from the water supply is always introduced into the lower end of the tank through the pipe 2, and as the casing 5 which encloses the heating element projects into the body of water in the tank 1, heat will be radiated laterally therefrom and assist in heating the water in the tank. However the greater heating effect will be upon the small stream of water flowing through the circulating pipe 8 which passes directly and axially through the heating element.

With this arrangement a very rapid heating of the water in the tank is secured, and should it be necessary for the purpose of replacement or repair, to remove the heating element, it is only necessary to disconnect the pipe 17 from the lower end of the pipe 8, remove the nut 12 which holds the heating element in place upon the pipe 8 and slide this element endwise from the open lower end of the casing 5.

It is obvious that changes may be made within the scope of the appended claims without departing from the spirit of the present invention, and I do not therefore limit myself to the particular construction shown.

Having thus fully described my invention, what I claim is:—

1. A water heater comprising a water receptacle having an opening in the bottom thereof, a bushing secured in said opening, a tubular casing detachably mounted in said bushing and extending into said receptacle with its inner end closed and its outer end open, a water circulating pipe extending axially of said casing and extended through and secured to the inner closed end of the casing, a water conduit connecting the outer end of said pipe and the lower part of said receptacle, an electric heating unit sleeved upon the said pipe within the casing and including a disk forming a closure for the outer open end of the casing, and means on the pipe for detachably securing said unit in place upon said pipe, with its disk closing the outer end of the casing.

2. A water heater comprising a water tank having an opening in the bottom thereof, a tubular casing secured in said opening and extending upwardly in said tank, the upper end of said casing being closed and its outer end open, a water circulating pipe extending axially of said casing through and secured to the closed end thereof and opening at its upper end into the upper end portion of said tank, an electric heating unit sleeved freely movable upon said pipe within said casing and removable through the open lower end thereof, said unit including a disk forming a closure for the open end of said casing, and means for detachably securing said unit in place upon said pipe with said disk closing said lower end of said casing.

In testimony whereof I affix my signature.

HERBERT W. CHRISTIAN.